Sept. 12, 1933.  J. P. KRUSE  1,926,291
COW TAIL HOLDER
Filed July 19, 1930
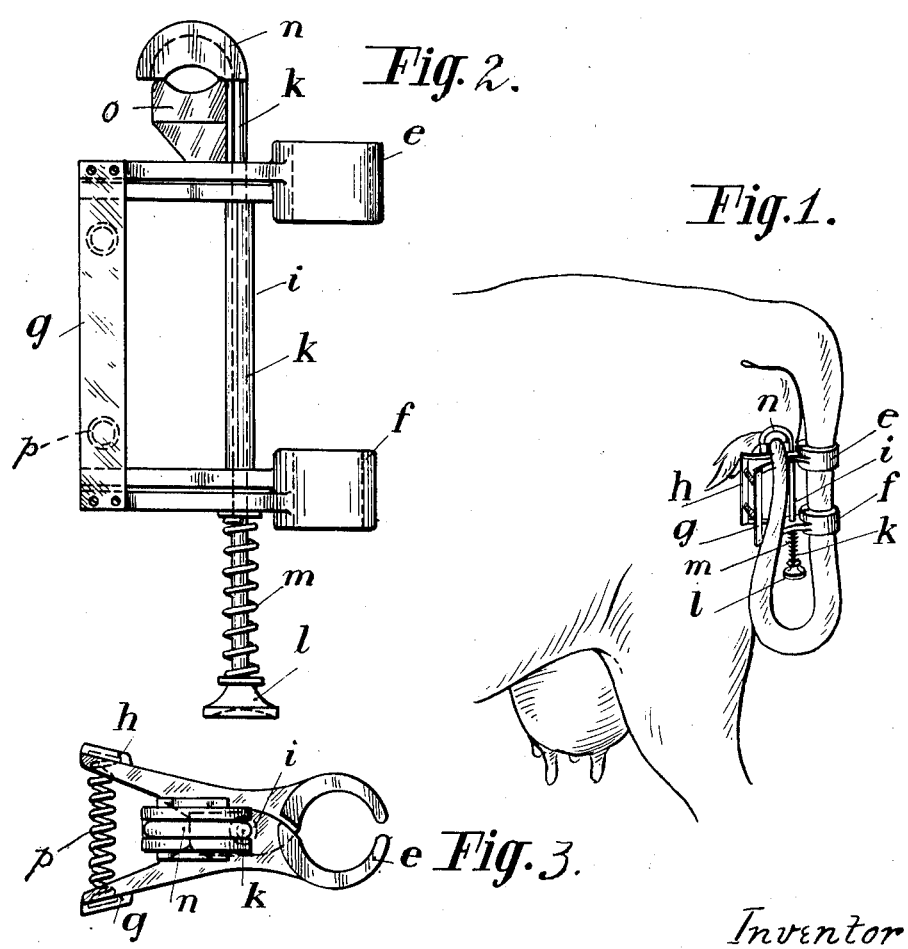
Inventor:
Jan Peter Kruse Patented Sept. 12, 1933

1,926,291

UNITED STATES PATENT OFFICE 1,926,291

COW-TAIL HOLDER

Jan Peter Kruse, Grossenbrode, near Heiligenhafen, Germany

Application July 19, 1930, Serial No. 469,231, and in Austria May 20, 1930

2 Claims. (Cl. 119—105)

This invention relates to a device for retaining a cow's tail in doubled-up position during milking so as to prevent the milker from being inconvenienced by the brush of the tail, and the invention consists in the provision of a pair of interconnected, co-axial, spring-controlled shear clips adapted to grip the tail at the root, one of said clips carrying an additional clip member adapted to engage the tail at the brush so as to hold the tail in doubled-up position.

Fig. 1 of the accompanying drawing represents a view of a device according to the invention in operative position, Fig. 2 is a side view of the device on an enlarged scale, and Fig. 3 is a top view of the device.

The device comprises two clips $e$ and $f$ both composed of shear members which are connected in pairs by stays $g$ and $h$, the latter serving as handles whereby the clips can be opened in opposition to springs $p$. One pair of shear members is secured to a hollow shaft $i$, and the other pair of shear members is mounted rotatably on a rod $k$ which passes through and is slidably within the shaft $i$. Both clips are adapted to grip the tail near the root as shown in Fig. 1. One end of the rod $k$ is formed with a hook $n$ whereby the brush portion of the tail can be engaged and clamped to a counter support $o$ on one of the shear members as shown in Fig. 1, thereby retaining the tail in doubled-up position. A spring $m$ arranged on the projecting rod beneath the structure and between one of the shear members and a knob $l$ on the rod, tends to hold the hook $n$ in clamping position. The knob $l$ can be used for raising the hook so as to release the tail.

I claim:

1. In the device for restricting the movements of a cow's tail during milking, the combination with a structure comprising a pair of interconnected, co-axial, spring-controlled shear clips adapted to grip the tail at the root, of a third spring-controlled clip mounted on the structure and operating at right angles to said former clips for holding the brush of the tail.

2. A device for restricting the movement of a cow's tail during milking, comprising a hollow shaft, a hooked rod slidably mounted within said shaft, a pair of interconnected, co-axial, spring-controlled shear clips mounted one at each end of said shaft, one shear member of each pair being secured to the shaft, the other shear members being rotatable on said rod, a counter member carried by one of said clip members and operative to clamp the brush of the tail between it and the hook of said rod, and a spring operative to press the hook against said counter member.

JAN PETER KRUSE.